United States Patent [19]
Srinivasan et al.

[11] Patent Number: 5,830,555
[45] Date of Patent: *Nov. 3, 1998

[54] THERMALLY APERTURED NONWOVEN PRODUCT AND PROCESS FOR MAKING SAME

[75] Inventors: Ramesh Srinivasan, Billerica; W. Andrew Coslett, Medfield, both of Mass.

[73] Assignee: International Paper Company, Purchase, N.Y.

[*] Notice: The term of this patent shall not extend beyond the expiration date of Pat. No. 5,567,501.

[21] Appl. No.: 651,773

[22] Filed: May 22, 1996

Related U.S. Application Data

[60] Continuation-in-part of Ser. No. 464,914, Jun. 5, 1995, Pat. No. 5,656,119, which is a division of Ser. No. 260,126, Jun. 15, 1994, Pat. No. 5,567,501.

[51] Int. Cl.$^6$ .............................. B32B 3/24; A61F 13/46
[52] U.S. Cl. ........................ 428/137; 428/138; 428/131; 428/213; 428/220; 428/198; 604/358; 604/378; 604/383; 442/387; 442/394; 442/409
[58] Field of Search ................................ 428/137, 138, 428/131, 213, 220, 198; 604/358, 378, 383; 442/387, 394, 409

[56] References Cited

U.S. PATENT DOCUMENTS

| | | | |
|---|---|---|---|
| 3,221,738 | 12/1965 | Ekberg et al. | 128/287 |
| 3,507,943 | 4/1970 | Such et al. | 264/103 |
| 3,542,634 | 11/1970 | Such et al. | 161/88 |
| 3,575,764 | 4/1971 | McFarren | 156/309 |
| 3,620,906 | 11/1971 | Hannes | 161/203 |
| 3,649,431 | 3/1972 | Parker | 428/137 |
| 3,678,933 | 7/1972 | Moore et al. | 128/296 |
| 3,695,967 | 10/1972 | Ross | 156/202 |
| 3,850,785 | 11/1974 | McQuade et al. | 161/88 |
| 3,925,127 | 12/1975 | Yoshioka | 156/85 |
| 4,184,902 | 1/1980 | Karami | 156/85 |
| 4,348,444 | 9/1982 | Craig | 428/137 |
| 4,355,066 | 10/1982 | Newman | 428/198 |
| 4,588,630 | 5/1986 | Shimalla | 428/131 |
| 4,726,976 | 2/1988 | Karami et al. | 428/137 |
| 4,758,297 | 7/1988 | Calligarich | 156/251 |
| 4,780,352 | 10/1988 | Palumbo | 428/138 |
| 4,842,596 | 6/1989 | Kielpikowski et al. | 604/385.2 |
| 5,188,625 | 2/1993 | Van Iten et al. | 604/383 |
| 5,364,681 | 11/1994 | Pate et al. | 428/137 |
| 5,567,501 | 10/1996 | Srinivasan et al. | 428/137 |
| 5,628,097 | 5/1997 | Benson et al. | 28/165 |

FOREIGN PATENT DOCUMENTS

97/10979  4/1996  WIPO.

OTHER PUBLICATIONS

Encyclopedia of Polymer Science and Engineering, vol. 7 (1987), p. 98.
McGraw–Hill Dictionary of Scientific and Technical Terms, 3d. Ed. (1984), p. 238.

*Primary Examiner*—William P. Watkins, III
*Attorney, Agent, or Firm*—Ostrager Chong Flaherty & Onofrio

[57] ABSTRACT

An apertured nonwoven fabric comprising one or two outer carded web(s) and a polymeric sheet thermally bonded thereto. The polymeric sheet has a lower melting temperature than the nonwoven layers and a property of shrinking when melted. Heat and pressure are applied to the combination of layers through a calender roll such that the polymeric sheet becomes bonded to the fibers of the carded web(s) and simultaneously shrinks and pulls back the fibers away from the calendering points, thereby generating apertures through the nonwoven fabric. Preferably, the fibers are polyethylene or polypropylene fibers, and the polymeric sheet is a thin plastic film of linear low density polyethylene, elastomeric, or heat shrink material. One outer carded web may be combined with the plastic film layer to form a bi-laminate product, or two outer carded webs may be combined with an intermediate plastic film to form a tri-laminate product. Low denier polypropylene/polyethylene bi-component fibers or a blend of higher and lower melting fibers may also be used. Apertured products can also be obtained with non-thermoplastic outer layers and an intermediate plastic film layer.

17 Claims, 9 Drawing Sheets

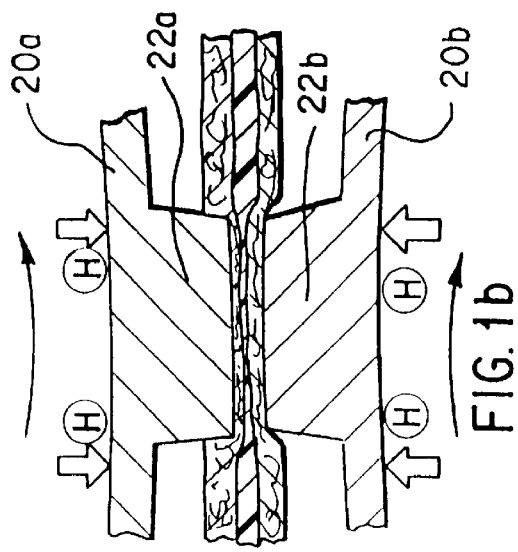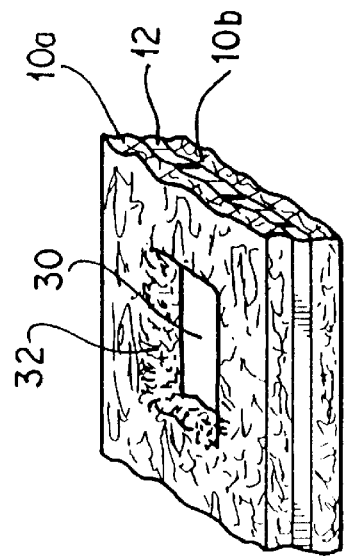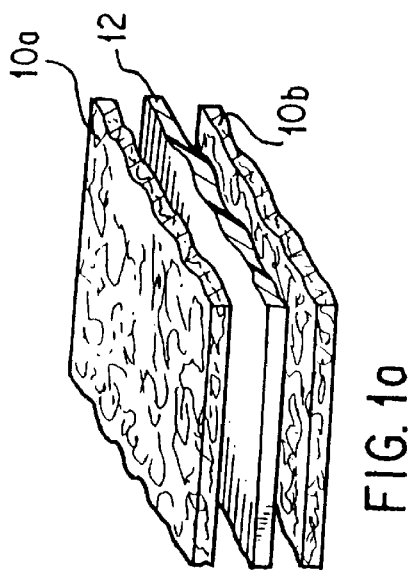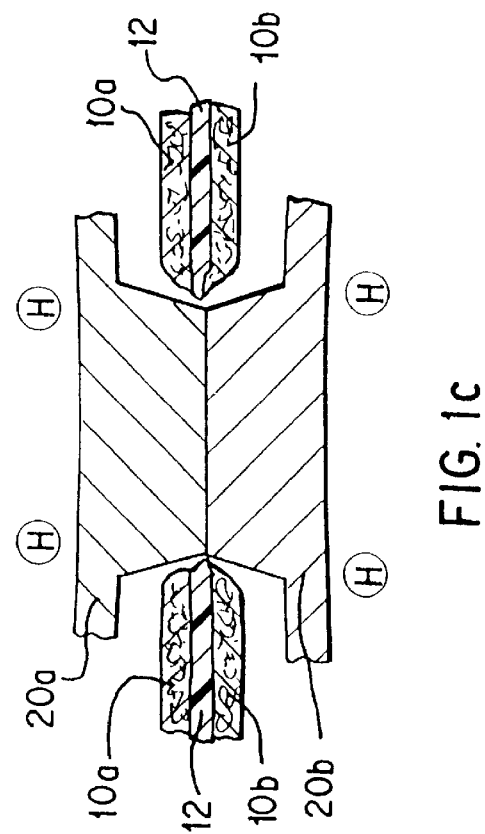

THERMALLY APERTURED NONWOVEN PRODUCT AND PROCESS FOR MAKING SAME

This application is a continuation-in-part of application Ser. No. 08/464,914 filed on Jun. 5, 1995 now U.S. Pat. No. 5,656,119 which is a Divisional Application of application Ser. No. 08/260,126 now U.S. Pat. No. 5,567,501 filed on Jun. 15, 1994.

FIELD OF THE INVENTION

This invention relates generally to apertured nonwoven fabrics and, particularly, to an apertured nonwoven topsheet product formed by a thermal aperturing process.

BACKGROUND ART

Apertured nonwoven fabrics are used in environments where it is desired to combine the properties of a fluid pervious outer layer for contact with the skin of a user with an absorbent layer having fluid absorption capacity. Such apertured nonwoven fabrics find use as a topsheet in diapers, sanitary napkins, adult incontinence products, and other hygienic products.

Traditionally, apertured nonwoven fabrics are formed by hydraulic processes such as hydroentangling a fibrous web with an apertured pattern or spunlacing, by mechanical processes such as perforating or punching a nonwoven fabric, or by thermo-mechanical processes such as hot pin perforation, etc. Hydraulic processes require rather costly equipment and complex processing operations. Mechanical or thermo-mechanical processes also require multiple processing steps, e.g., by first forming a bonded nonwoven fabric then perforating or aperturing the same.

Some thermo-mechanical processes, such as taught in U.S. Pat. Nos. 3,507,943 and 3,542,634, can bond and aperture a fibrous layer in one step by pressure fusing the fibers of the nonwoven layer between contact points of embossed rolls or land-groove rolls and at the same time forming apertures therethrough by melting with sufficient heat and pressure, shearing action, etc. However, a high amount of heat and pressure is required to produce well-formed through-holes in the nonwoven layer. Other processes, such as taught in U.S. Pat. No. 4,780,352 to Palumbo, form a topsheet in one processing step by perforating a fluid-pervious nonwoven layer with a plastic intermediate layer.

It is therefore a principal object of the present invention to produce an apertured nonwoven fabric through a one-step cost-effective process using a simplified technique for generating apertures of sufficient size and shape. It is a particular object that such process take advantage of a physical interaction between polymeric materials of different melting temperatures under application of heat and pressure from the calendering points of a calender roll to accomplish simultaneous bonding of the fibers and forming of apertures through the nonwoven fabric.

SUMMARY OF THE INVENTION

In accordance with the present invention, a process for producing an apertured nonwoven fabric comprises the steps of combining a carded web of fibers having a higher melting temperature and a polymeric sheet having a lower melting temperature and a property of shrinking under application of heat, and applying heat and pressure to the combination of the carded fibers and the polymeric sheet through calendering points of a calender roll, such that the melted polymeric sheet becomes bonded to the carded fibers and simultaneously shrinks and pulls back the carded fibers away from the calendering points, thereby generating apertures completely through the nonwoven fabric.

In the preferred process, the fibers of the carded web(s) are carded olefinic fibers, preferably polyethylene or polypropylene fibers, and the polymeric sheet is a thin plastic film of olefinic material, such as a linear low density polyethylene (LLDPE) diaper backsheet film, or elastomeric material, or heat shrink material. The apertured product can have anywhere from 1–50% open (apertured) area. The process can be utilized for apertured nonwoven fabrics having basis weights ranging anywhere from 10.0 to 90.0 grams/yd$^2$ (gsy). One outer carded web may be combined with the polymeric sheet to form a bi-laminate product, or two outer carded webs may be combined with an intermediate polymeric sheet to form a tri-laminate product.

In one particular example, the fibers of the carded web(s) are high tenacity, low elongation polypropylene having a melting point of about 165° C., and the plastic film is a 17-gsy LLDPE film having a melting point of 125° C. Alternatively, low denier polypropylene/polyethylene bi-component fibers or a selected blend of low and high melting fibers may be used to obtain the same physical effect of shrinking and pulling back the fibers to form apertures through the nonwoven fabric. A similar effect can be obtained when non-thermoplastic fibers in the outer layers are bonded to and pulled back by an intermediate plastic layer. The resulting products exhibit good bonding, suitable strength, well-formed apertures and improved strikethrough and rewet values. Accordingly, the apertured nonwoven fabrics of the invention are particularly suited for use as topsheets in absorbent products, such as diapers, sanitary napkins, and adult incontinence pads.

Other objects, features and advantages of the present invention are described in detail below in conjunction with the drawings, as follows:

BRIEF DESCRIPTION OF THE DRAWINGS

FIGS. 1*a*, 1*b*, 1*c*, and 1*d* illustrate the thermal aperturing technique in accordance with the invention for the general example of a tri-laminate product having outer nonwoven layers and an intermediate polymeric layer.

DETAILED DESCRIPTION OF THE INVENTION

Figure 2:
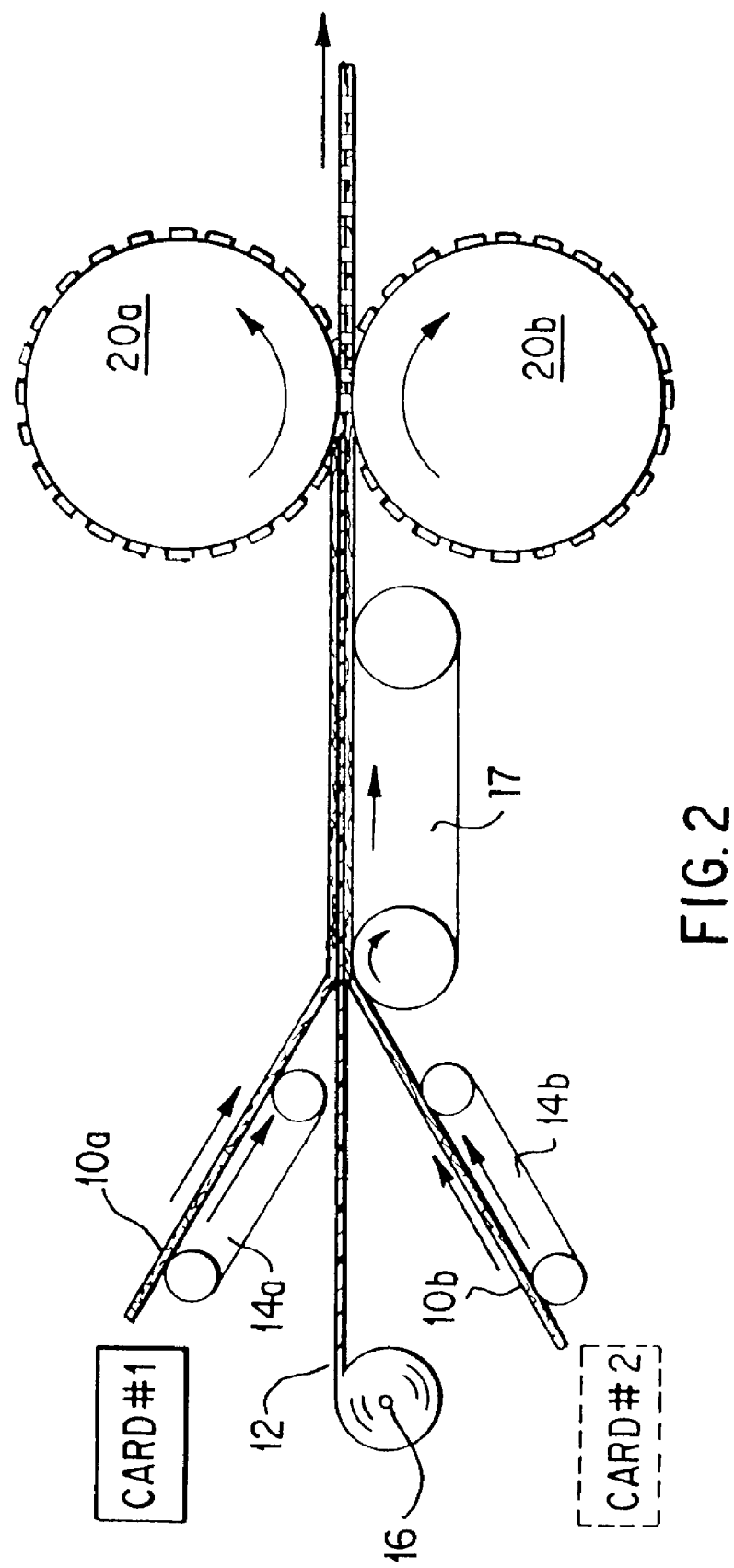
FIG. 2 is a schematic view of a process line for the manufacture of apertured nonwoven fabric in accordance with the invention.

In the present invention, a one-step bonding and aperturing process is used for manufacturing an apertured nonwoven product using thermal bonding (i.e., heated calendering) technology. The apertured nonwoven product is produced by combining one or two carded web(s) of fibers with a polymeric sheet having a lower melting temperature and a property of shrinking when melted, such that under the application of heat and pressure the polymeric sheet becomes bonded to the carded web(s) and shrinks and pulls back the carded fibers to form apertures completely through the nonwoven fabric. The fusing and pulling back of the fibers by the melting/shrinking polymeric sheet is evident from the crusted ring of fused or congealed material surrounding the apertures and bonding the layers together.

The fibers of the carded web(s) are made of a polymeric material. Preferably, they are olefinic fibers such as polyethylene or polypropylene, and most preferably, high tenacity, low elongation polypropylene fibers. These types of polypropylene fibers are typically used in textile industries such as carpet manufacturing. They are brittle and move readily under the shrinking action of a polymeric film. Apertured nonwoven fabrics made from these fibers obtain the softness and extensibility (or drapeability) that is required in the absorbent products industry from the type of polymeric sheet employed, the presence of apertures in the fabric, and the temperature employed during processing. Desirable apertured nonwovens in accordance with the invention were obtained using low elongation, high tenacity polypropylene fibers, such as, for example, Herculon fibers (Hercules Corporation, Norcross, Ga.) designated T116, T117, T118, T101, T123, T124 and T142.

Such fibers differ significantly from fibers used in the manufacture of non-apertured nonwovens. Soft, drapeable non-apertured fabrics are typically made from standard polypropylene fibers having low tenacity and high elongation. For example, polypropylene fibers designated Herculon T190, T195, T186 and T196 have been used. However, these standard polypropylene fibers do not move readily under the shrinking action of a polymeric film and cannot form apertures. Table 1 compares the properties of 2.0 denier polypropylene fibers which will form apertures in the fabric of the invention versus fibers which will not. Table 2 compares properties of polypropylene fibers having denier greater than 3.0.

The polymeric sheet comprises a material which is selected to have a melting temperature at least 35° C. lower than the melting temperature of the fibers located in the outer carded web(s) and to have the property of shrinking under application of heat. Preferred polymeric sheets which may be used include, but are not limited to, olefinic films, and most preferably, linear low density polyethylene ("LLDPE") diaper backsheet films. Several examples of LLDPE films are shown in Table 3. The characteristics of preferred LLDPE films are shown in Table 4. These films are commercially available from several suppliers including, but not limited to, Exxon Chemical Company, Lake Zurich, Ill. The caliper of preferred films varies from 0.5 to 1.0 mil, most preferably 0.8 mil, and the corresponding weights vary from 11 to 21 gsy, preferably 17 gsy.

TABLE 1

| PROPERTIES | FIBERS THAT APERTURE | | | | | FIBERS THAT DO NOT APERTURE | | | |
|---|---|---|---|---|---|---|---|---|---|
| | T116 | T117 | T118 | T123 | T101 | T190 | T195 | T196 | T186 |
| Dpf | 2.20 | 2.10 | 2.20 | 1.90 | 1.80 | 2.20 | 2.20 | 2.30 | 2.30 |
| Length (mm) | 38.0 | 38.0 | 38.0 | 38.0 | 38.0 | 38.0 | 38.0 | 38.0 | 38.0 |
| Tenacity (gpd) | 3.71 | 3.73 | 3.97 | 4.15 | 3.50 | 2.00 | 1.85 | 2.20 | n/a |
| Elongation (%) | 113.0 | 132.0 | 89.0 | 117.0 | 120.0 | 350.0 | 380.0 | 344.0 | 367.0 |
| Crimps/in. | 28.20 | 22.10 | 22.10 | 17.70 | 17.00 | 25.50 | 24.00 | 22.70 | 25.10 |
| Finish (%) | 0.75[1] | 0.71[2] | 0.28[3] | 0.53[4] | 0.55[1] | 0.30[3] | 0.22[3] | 0.57[2] | 0.79[5] |

[1]Regular Finish
[2]Hydrophilic Finish
[3]Hydrophobic Finish
[4]FDA Hydrophilic Finish
[5]Durable Hydrophilic Finish

TABLE 2

| PROPERTIES | FIBERS THAT APERTURE | | | FIBERS THAT DO NOT APERTURE | |
|---|---|---|---|---|---|
| | T142 | T117 | T101 | T198 | T186 |
| Dpf | 3.11 | 5.80 | 2.60 | 3.20 | 3.10 |
| Length (mm) | 38.00 | 38.00 | 38.00 | 38.00 | 38.00 |
| Tenacity (gpd) | 5.34 | 3.53 | 3.82 | 1.80 | 1.66 |
| Elongation (%) | 83.00 | 156.00 | 142.00 | 385.00 | 446.00 |
| Crimps/in. | 14.90 | 19.60 | 20.90 | 17.90 | 22.60 |
| Finish (%) | 0.83[1] | 0.54[2] | 0.90[1] | 0.87[2] | 0.67[3] |

[1]Regular Finish
[2]Hydrophilic Finish
[3]Durable Hydrophilic Finish

TABLE 3

| FILM COMPOSITION | EXAMPLE/ COMMON NAME | CALIPER (mils) | SUPPLIERS |
|---|---|---|---|
| Linear Low Density Polyethylene (LLDPE) | EMB 610 or other diaper backsheet cast embossed films | 0.5, 0.75, 0.9, 1.0, 1.2 | Exxon, Clopay, Tredegar |
| LLDPE blended with ethyl vinyl acetate copolymer (LLDPE/EVA) | Proprietary | 1.0, 1.5 | Proprietary |
| LLDPE blended with polystyrene | RX20, RN30 Sanitary napkin film | 1.0–3.0, 10–50% | Smith & Nephew |

TABLE 3-continued

| FILM COMPOSITION | EXAMPLE/ COMMON NAME | CALIPER (mils) | SUPPLIERS |
|---|---|---|---|
| Proprietary | Styrenic block copolymer based blown elastomeric films like Exx 553, Exx 560 | open area 1.6, 1.8, 2.0, 2.4, 3.0 | Exxon |
| Proprietary | Heat shrink, meat packaging film | 1.0–2.0 | DuPont, W. R. Grace |
| LLDPE | Shrink Wrap/ Stretch Wrap/ palletizing film | 0.6, 0.8, 1.0, 1.2, 1.5 | Mobil, AEP, Borden |
| Polypropylene | Flexible polyolefins/ soft polypropylene | Various 1.5 | CT film, |
| Coextruded LLDPE films: | Various | Various | Various |
| (a) EVA on 1 side | | | |
| (b) EVA on 2 sides | | | |

TABLE 4

| | |
|---|---|
| Opacity | 44.10–58.50 |
| COF | 0.85–1.13 |
| MD tensile (psi) | 1,450.00–2,412.00 |
| MD elongation (%) | 490.00–538.00 |
| CD tensile (psi) | 871.00–2,388.00 |
| CD elongation (%) | 546.00–584.00 |

Other materials may also be used as the polymeric sheet, including, but not limited to, elastomeric, heat shrink and apertured plastic films, or in lieu of a film, a mix of low and high melt polypropylene and polyethylene fibers or polyproplylene/polyethylene bicomponent fibers can be used. Further, the apertured fabric of the invention may be formed as a bi-laminate or tri-laminate product. Where a plastic film is used, apertured fabric can be made one-sided or two-sided. When the plastic film is embedded between two layers of fiber, a product having either the same feel on both sides or having one soft side and one rough side is made, referred to herein as a "tri-laminate" product. On the other hand, attaching the plastic film to either side of the fiber layer results in a product having a different feel on its two sides. One side feels soft due to the presence of fibers, while the other side feels like plastic. This is referred to as a "bi-laminate" product.

Figure 3:
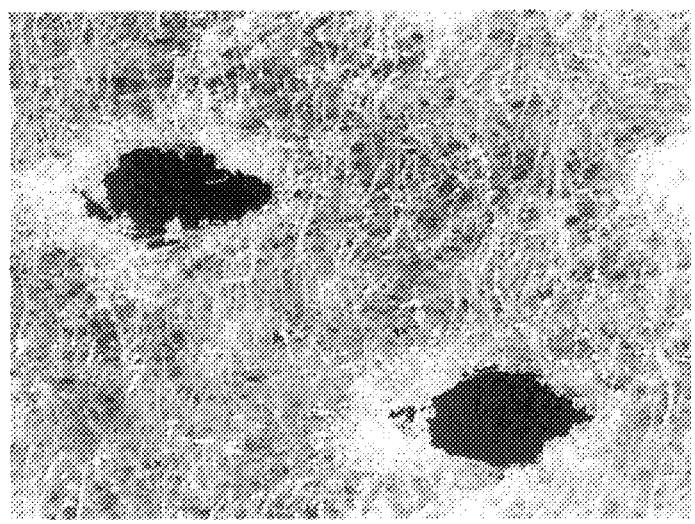
FIGS. 3, 4, 5, 6, 7, and 8 are photographic examples of apertured nonwoven products produced in accordance with the thermal aperturing technique of the invention.
Figure 4:
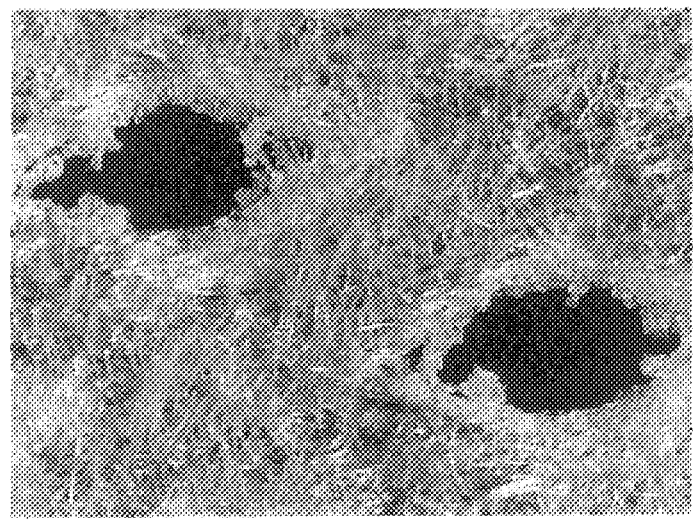

For example, it is has been found that using LLDPE film as the polymeric sheet and embedding it between two layers of carded fibers produces a tri-laminate product with good aperture quality at the lowest cost. A desirable product can be made having a weight from 30 to 46 gsy using low-elongation, high tenacity polypropylene fibers for the carded webs, such as fibers designated T101 1.8 dpf×38 mm obtained from Hercules Corp., of Norcross, Ga., and 16 gsy clear stretch wrap film, such as Loadmaster-S, PC-3400, 1.0 mil, LLDPE stretch wrap film, from Borden Packaging and Industrial Products, of North Andover, Mass. FIG. 3 shows a tri-laminate product obtained with polypropylene outer layers and an intermediate thin film. FIG. 4 shows a tri-laminate product with polypropylene/polyethylene outer layers using calender rolls of a greater land width (16% apertured area). The above-mentioned polypropylene fibers have a melting point of about 165° C. (330° F. ), and the polyethylene stretch-wrap has a melting point of about 125° C. (260° F. ). Optimum softness and hole clarity were obtained at calender roll temperatures of 320° F. in particular and 300° F. to 360° F. in general when using polypropylene fibers, and at calender roll pressures in the range of 55 psi (pounds/sq. in.) or 300 pli (pounds/linear inch).

An apertured plastic film can be used in place of the LLDPE stretch wrap film. For example, apertured polyethylene films of different grades, thicknesses, and compositions with or without ethylvinyl acetate copolymer (EVA) can be used. The apertured film embedded between two layers of fibers results in a tri-laminate product with very good aperture quality, particularly for films containing an EVA copolymer. The product exhibits good uni-directional passage of fluid. A bi-laminate variation can also be made.

Figure 7:
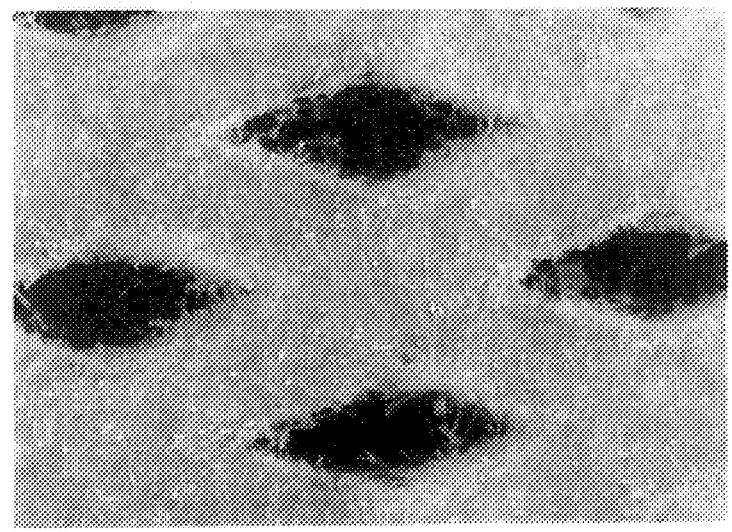
Figure 8:
Figure 9:
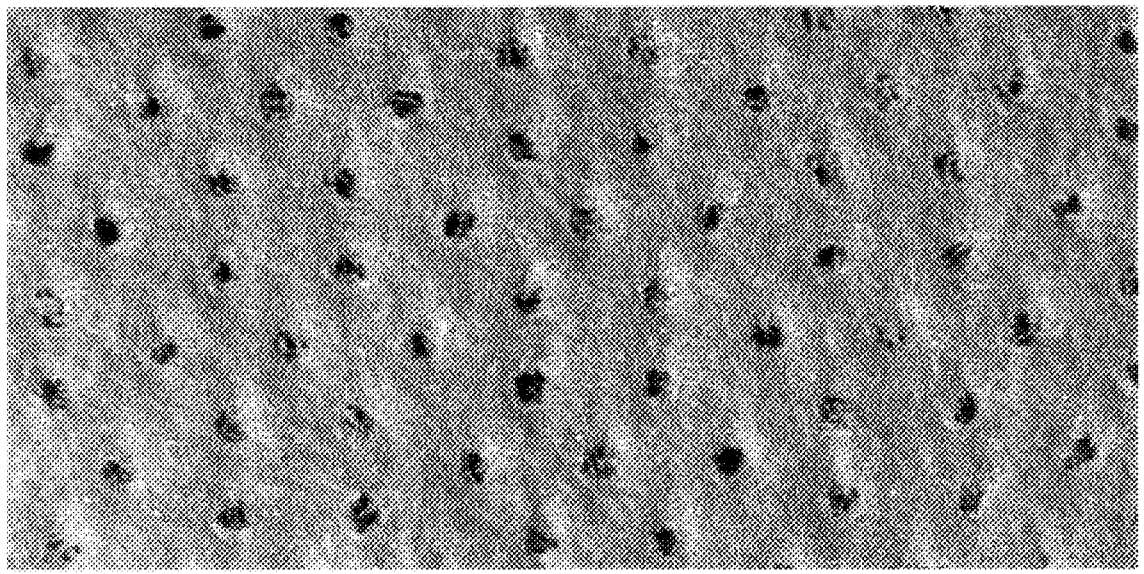
FIGS. 9, 10, 11, and 12 are photographic examples of apertured nonwoven products in accordance with the invention showing four different aperture shapes and sizes.
Figure 10:
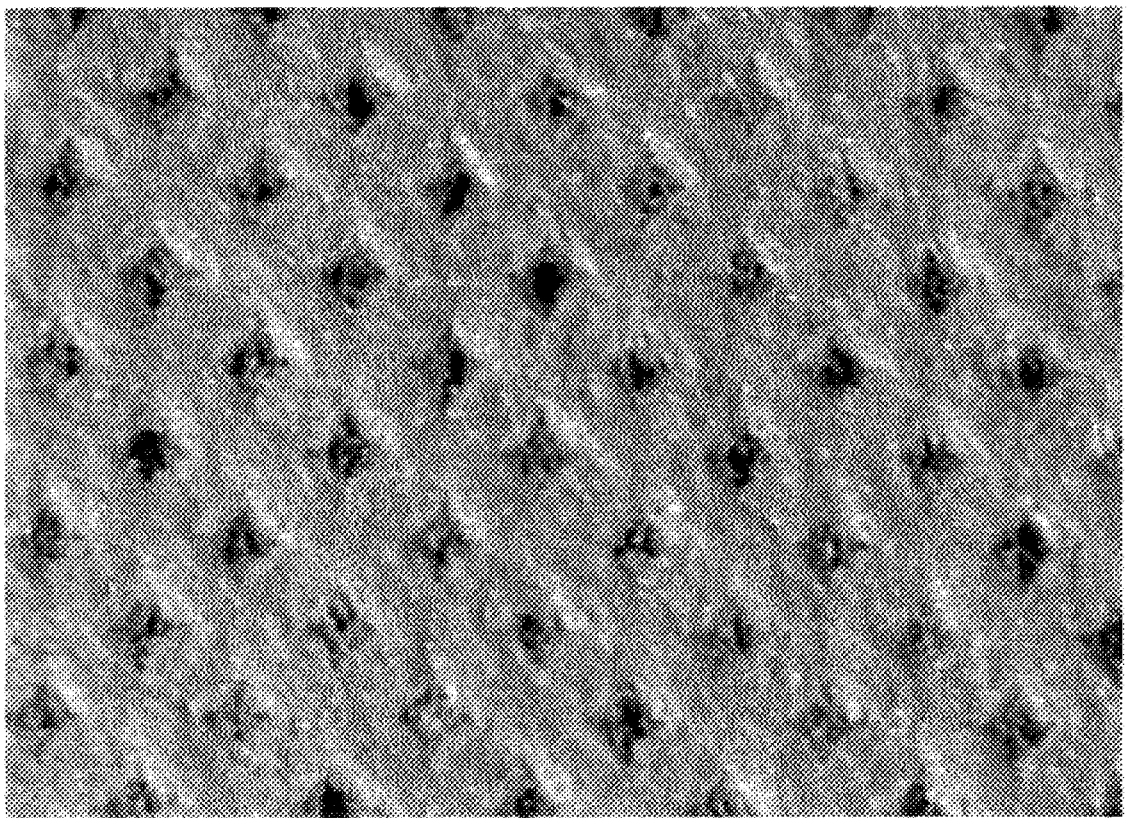
Figure 11:
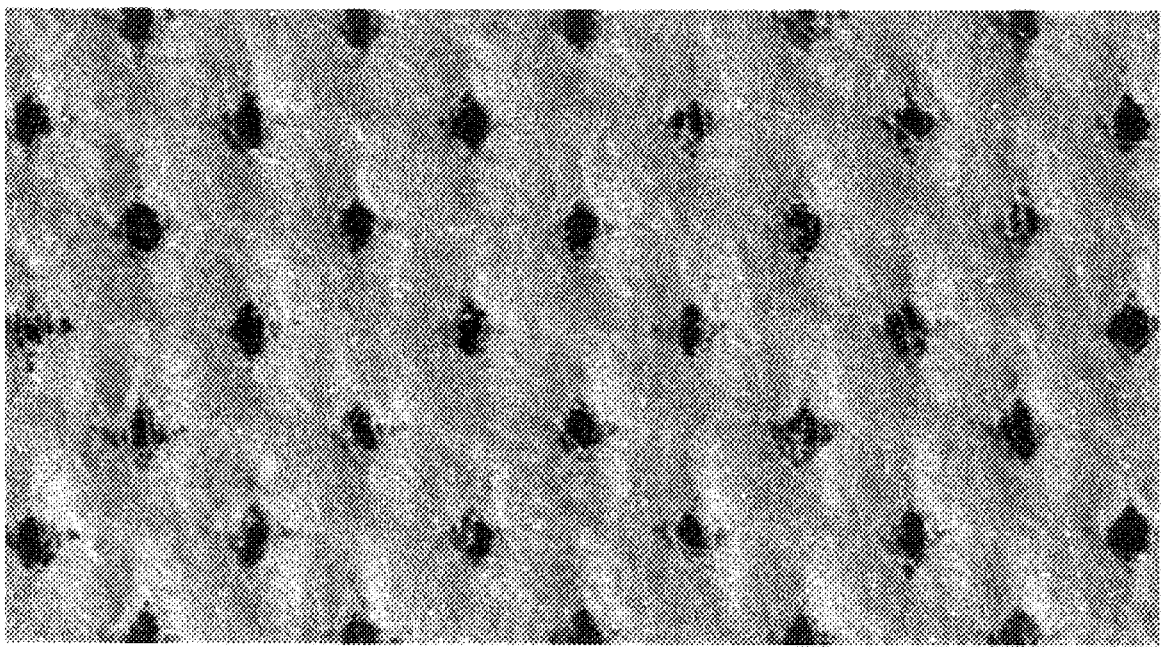
Figure 12:
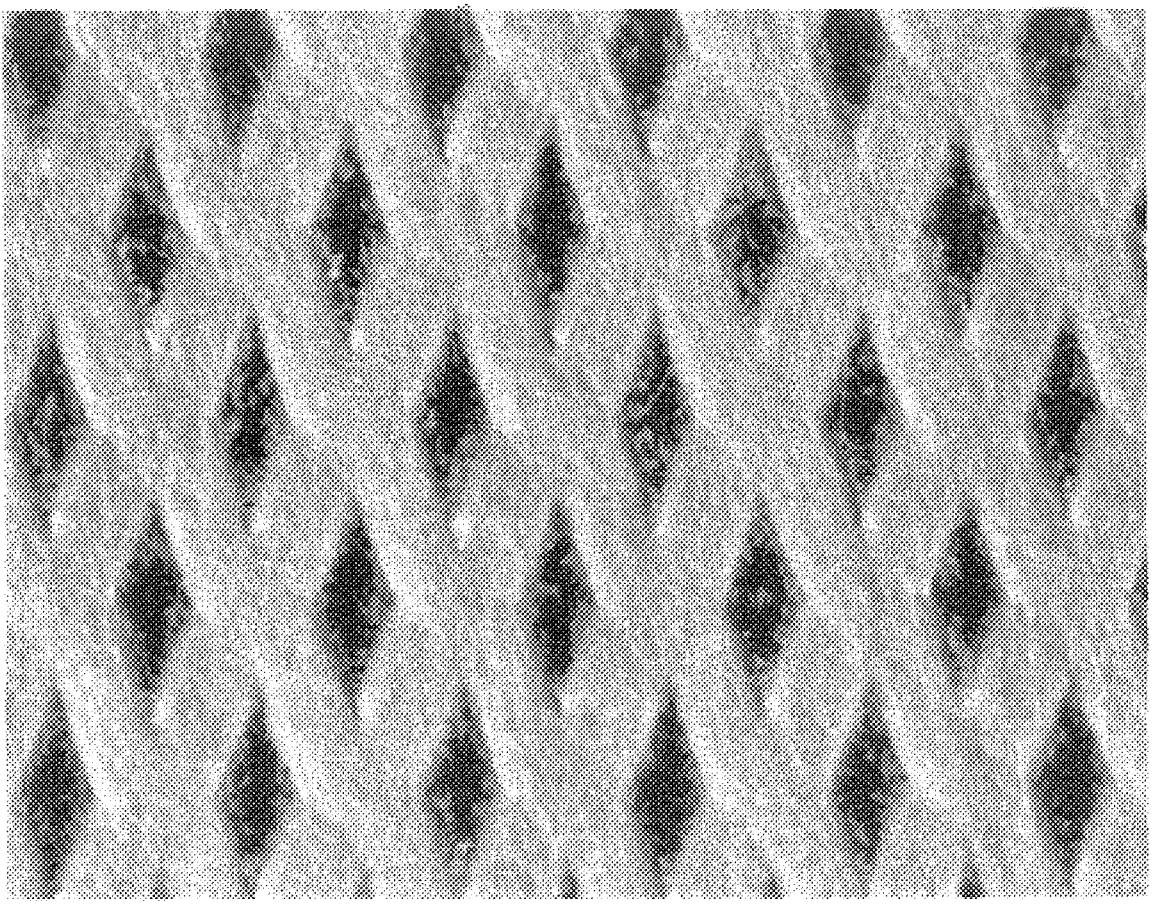

The thermal aperturing technique was also found to be adaptable to tri-laminate products having non-thermoplastic fibers, e.g., rayon for the carded webs, and a suitable plastic film in between. Good apertured products were obtained using 15 gsy Hercules T101 PP fiber in one layer and 15 gsy Courtaulds rayon (1.5 dpf×40 mm) fibers in the other layer, with LLDPE stretch wrap, LLDPE with EVA copolymer, and elastomeric styrenic block (SB) copolymer based films. A unique product having good to excellent aperture quality can be made with 15 gsy rayon fibers in both layers and an LLDPE with EVA copolymer or elastomeric styrenic block copolymer film in between. A product having excellent aperture quality can also be obtained with rayon fibers in both layers and a stretch wrap film in between if the calender roll temperature is increased substantially higher, e.g., 412° F. (instead of 320° F. ). A product with excellent aperture quality can also be produced using the Hercules T101 PP fibers as the intermediate layer, but the resulting fabric has lower tensile strengths than when using plastic films. FIGS. 7 and 8 show tri-laminate products having an apertured polyethylene film sandwiched between two outer carded webs. The outer carded webs in FIG. 7 comprise a mix of polypropylene and rayon fibers and in FIG. 8 comprise only rayon fibers.

Figure 6:

Low denier polypropylene/polyethylene bi-component (PP/PE) fibers are also suitable for this thermal aperturing technique. The low melting polyethylene sheath in contrast to the higher melting polypropylene core acts similar to the thin olefinic film described above. In typical examples, cleanly apertured products were manufactured using Chisso ES 0.9 dpf×38 mm bi-component fibers obtained from the Chisso Company of Japan carded in two layers without any intermediate layer. FIG. 6 shows an elastomeric apertured product obtained with PP/PE bicomponent fibers in two layers without any intermediate layer. Calender roll temperatures of 290° F. to 295° F. were found to work best with the PP/PE bi-component fibers.

A similar variation exploits the same physical effect by blending fibers with higher and lower melting points. The melting point differential is selected to simulate the effect of the thin olefinic film in pulling back the fibers from the aperture areas. As an example, 20% of low melting polyethylene fiber can be blended with 80% polypropylene fibers to produce a suitable apertured product.

Figure 5:
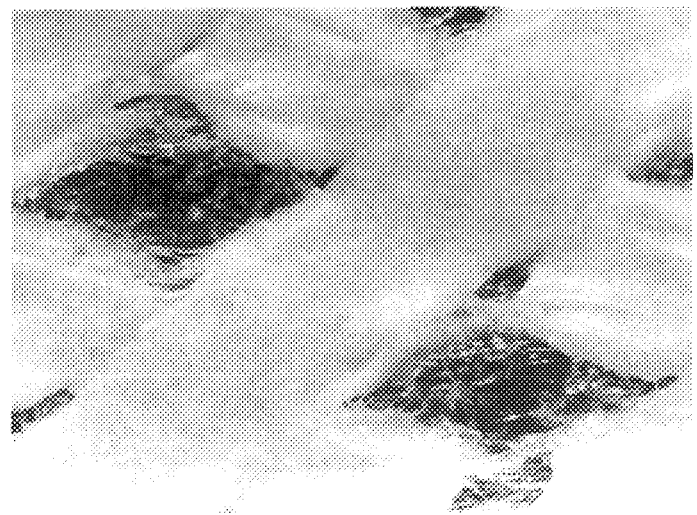

Elastic properties can be imparted to the apertured product by the use of an elastomeric film in place of the thin olefinic film. For example, an elastomeric film such as one designated Exx 560 obtainable from Exxon Chemicals Corp., of Lake Zurich, Ill., can produce a product of good aperture clarity and excellent elastic properties in both the machine and cross directions. Both tri- and bi-laminate products can be made. FIG. 5 shows a bi-laminate product obtained with one polypropylene outer layer and an elastomeric film.

Heat-shrink films may also be used to obtain the same physical effect of shrinking and pulling back the fibers to form apertures through the nonwoven fabric. For example, low-melting high-shrink films obtained from Exxon Chemicals Corp. produced a product with good aperture quality. Another high shrink film, designated CLYSAR™, Grade #60LLP, from DuPont Corp., gave a unique, bulky, apertured fabric. Only tri-laminates are possible in this case because of the shrink film's reaction to a surface applying heat.

An example of the general process for forming thermally apertured nonwoven fabric in accordance with the invention is illustrated in FIGS. 1a–1d using a film as the polymeric sheet. One or two outer carded web(s) 10a, 10b and a thin film 12 are fed in superposed relation through the nip of a pair of heated calender rolls 20a, 20b. The calender rolls have a plurality of calendering points or lands 22a, 22b which come together to apply heat and pressure to the superposed layers fed in between.

As shown in FIG. 1c, application of suitable heat and pressure causes the lower melting film 12 to melt and suddenly shrink away from the area of the calendering points 20a, 20b. While shrinking away, the melting film fuses to the fibers of the webs 10a, 10b and pulls the fibers back away from the calendering points 22a, 22b. As shown in FIG. 1d, the result is that the film 12 and the fibers of the carded webs 10a, 10b become fused to each other, forming a crusted ring of fused matter 32 around the area of the calendering points 22a, 22b. This crusted ring serves simultaneously to bond the layers together and to define an aperture 30 (or "through-hole") completely through all layers of the nonwoven fabric having a fused border along the periphery thereof. The film acts as a carrier to move the fibers away from the calendering points 22a, 22b and to create the aperture 30.

In FIG. 2, a process line is shown schematically for the manufacture of apertured nonwoven fabric as a continuous roll product. The fibers of the carded web(s) are carded at card stations #1 and #2 and fed on card conveyors 14a, 14b, respectively, to form the webs 10a, 10b of fibers. The thin film 12 is unwound from an unwind stand 16 and fed in superposed relation between the two carded webs on the card conveyors, and the composite of film enclosed between two carded webs is fed by conveyor 17 to hot calender rolls 20a, 20b to be thermally bonded and apertured. The calender rolls 20a, 20b are heated to a temperature of 200° F.–600° F., preferably 300° F.–400° F., and apply pressure in the range of 150–900 pounds per linear inch, preferably 300–600 pli. The carded webs and polymeric sheet are processed at a speed of 100–700 fpm, preferably 200–400 fpm.

Samples of the apertured nonwovens of the invention were made using a pilot thermal bonding line with 10" width. Scaling up to a 32" wide line tested successfully. Pilot line speeds of up to 150 feet/minute were run without any problems. The use of stretch wrap film and LLDPE film with EVA copolymer embedded in PP fiber layers produced very good aperture quality, particularly at 32 gsy fabric weight. Calender roll temperatures of between 328° F. to 332° F. and calender pressures of 400–550 pli on the 10" line and 250–300 pli on the wider thermal bonding line were found to provide optimum results. Good aperture quality was obtained with calender rolls having the Novonette pattern and land widths of 0.065" and 0.081", for percentage of apertured areas of 9% and 16%, respectively.

The preferred practice employs dual engraved rolls (Novonette #2 pattern), although anvil rolls or even a single engraved roll have been successfully utilized. On entering the heated calender rolls, the olefinic fibers are bonded together and the film melts and shrinks away from the calendering points to generate a pattern of apertures. On exiting the calender rolls, the bonded and apertured nonwoven fabric is wound up on a roll.

The apertured product can be formed with typically 1–50% open (or apertured) area. However, the product can be tailored with any required open area (i.e., shape, size, open area %) by modifying the type of calender roll used, the calender bond pattern, process conditions, etc. For example, four types of apertures have been formed in our tests, including circular or oval, and three sizes (small, medium and large) of diamond shaped apertures. FIGS. 9–12 are photomicrographs showing samples of the apertured nonwoven of the invention having the four different types of apertures. The characteristics of different aperture types are shown in Table 5. All apertures have been approximated to be rectangular. The aperture sizes vary from 0.5–2.5 mm in the length dimension and 0.25–1.0 mm in the width direction. Larger aperture sizes are under development.

TABLE 5

| Sample No. | Aperture (Shape) | Size (mm) | Area (sq.in.) | Apertures (per sq.in.) | Open Area (%) |
|---|---|---|---|---|---|
| 1 | circular/oval | 0.67 × 0.38 | $3.946 \times 10^{-4}$ | 115 | 4.50 |
| 2 | small diamond | 0.52 × 0.45 | $3.627 \times 10^{-4}$ | 241 | 8.70 |
| 3 | small diamond | 1.13 × 0.88 | $1.541 \times 10^{-3}$ | 67 | 10.30 |
| 4 | medium diamond | 1.90 × 1.14 | $3.357 \times 10^{-3}$ | 55 | 18.50 |
| 5 | medium diamond | 2.03 × 1.05 | $3.304 \times 10^{-3}$ | 56 | 18.50 |
| 6 | medium diamond | 2.20 × 1.00 | $3.410 \times 10^{-3}$ | 56 | 19.10 |

The apertured product can also be mechanically tentered (stretched) as it exits in a hot condition from the calender. Tentering can significantly enhance the aperture clarity and size.

The apertured nonwoven product thus formed is two-sided and, as such, is ideally suited for use as a topsheet in hygienic/absorbent products. One outer (or bodyside) surface is soft, smooth and has a quilted appearance. The other outer (or bottom) surface can be made to be rough and flat, or lofty, fibrous and fluffy. Further, on a per weight basis, some films are cheaper than the fiber. Therefore, in some cases, the cost of making the apertured fabric is significantly less than making a conventional apertured fabric of comparable weight using fibers alone.

Depending on the kind of plastic film used and the type of fiber employed, the fluid handling properties of the apertured nonwoven product can be modified as required for suitable strikethrough, re-wet, liquid distribution, and other properties. Strikethrough may be defined as the time required for a given amount of fluid to pass through an apertured nonwoven product. The less time it takes for the liquid to pass through the apertured nonwoven product the better the strikethrough value. Rewet may be defined as the amount of fluid which will tend to flow from an absorbent core back toward the outer face of an apertured nonwoven product when the core is completely saturated with fluid. Rewet is measured in grams and represents the surface dryness. The less fluid to reach the topsheet, the dryer the surface. Comparison trials showed that apertured products can be formed having the strikethrough and rewet properties equal to or better than a typical diaper topsheet.

The fabric can be formed to possess the desired softness for skin contact in various consumer disposable applications, as measured by hand-feel. However, a trade-off exists between fabric softness and the aperture clarity that is obtained. The elasticity of the apertured structure can be easily altered by using elastomeric materials instead of an olefinic film. Apertured products can be made in almost any weight, e.g., ranging from 10.0 to 90.0 gsy. A typical fabric for consumer disposable applications could be in the range of 35.0 to 55.0 gsy.

The apertured nonwovens in accordance with this invention have particular application as uni-functional diaper topsheets, multi-functional diaper topsheets, and sanitary napkin topsheets. Examples of such apertured nonwovens follow.

Uni-functional Diaper Topsheets

A uni-functional topsheet is a material that functions only as the top layer of a diaper, or the layer that is in contact with a baby. The top layer in many commercially available diapers is typically a composite comprising a nonwoven and a tissue glued together with no additional lofty second layer. The nonwoven/tissue composite is in direct contact with the absorbent core layer. Further, the nonwovens used in these commercial diapers is either hydrophilic carded thermal bond or a hydrophilic spunbond.

The apertured nonwoven topsheet of this invention can be used in lieu of the conventional nonwoven/tissue composite. The topsheet's outer fibrous layers may be a blend of several fibers depending upon the type of fluid handling required. For example, if it is desired that urine pass quickly through the topsheet to the core, a very hydrophilic fibrous layer would be required. However, this may not keep the surface dry enough to prevent diaper rashes on the baby. Therefore, a relatively low hydrophilic top layer may be desirable. The bottom layer should effectively distribute the urine to the core resulting in efficient core usage.

The fluid handling properties of the apertured nonwoven topsheets have been evaluated using the strikethrough and dryness test method widely known in the absorbent products industry. In this test method, strikethrough time and rewet values are measured using, for example, proprietary child synthetic urine, as the test fluid. The industry standard strikethrough time for uni-functional diaper topsheets is typically 3.0 seconds. The industry standard rewet value is 0.1 grams.

Characteristics and properties of several examples of uni-functional topsheets made from the apertured nonwoven of the invention are shown in Tables 6–8. Caliper or thickness was measured by a Thwing-Albert apparatus in mils. Tensile properties were measured in dry and wet conditions with a 25.4 mm×177.8 mm strip using an Instron tester. Table 6 shows three different variations of a uni-functional topsheet having circular or oval apertures and a basis weight of 34–40 gsy. Table 7 shows three different variations of a topsheet having medium sized diamond shaped apertures and a basis weight of 44 to 47 gsy. Table 8 shows four lower weight variations of the uni-functional topsheet comprising more hydrophilic fibers and no rayon.

TABLE 6

| COMPOSITION & PROPERTIES | L4 925.1 | L4 952.3 | L4 952.5 |
| --- | --- | --- | --- |
| TOP LAYER | 100% Herculon T116 polypropylene 2.2 dpf × 38 mm | 100% Herculon T116 polypropylene 2.0 dpf × 38 mm | 100% Herculon T142 polypropylene 3.25 dpf × 38 mm |
| MIDDLE LAYER | Exxon LLDPE film EMB 610 0.8 mils white | Exxon LLDPE film EMB 610 0.8 mils white | Exxon LLDPE film EMB 610 0.8 mils white |
| BOTTOM LAYER | 80% Herculon T124 polypropylene 2.0 dpf × 38 mm + 20% Courtaulds 5.0 dpf × 40 mm rayon fibers | 100% Herculon T117 polypropylene 6.0 dpf × 38 mm | 100% Herculon T117 polypropylene 2.0 dpf × 38 mm |
| Total weight, gsy | 40.00 | 38.00 | 34.00 |
| Caliper, mils | 19.00 | 21.00 | 18.00 |
| Strikethrough, sec | 2.20 | 3.70 | 3.80 |
| Rewet, gms | 0.07 | 0.06 | 0.05 |
| DRY STRIP TENSILES: | | | |
| MD tensile, g/in | 1,341.00 | 777.70 | 789.20 |
| MD elongation, % | 13.00 | 181.0 | 15.30 |
| CD tensile, g/in | 425.00 | 386.00 | 365.90 |
| CD elongation, % | 32.00 | 27.50 | 28.80 |
| WET STRIP TENSILES: | | | |
| MD tensile, g/in | n/a | 886.90 | 916.70 |
| MD elongation, % | n/a | 16.50 | 17.70 |
| CD tensile, g/in | n/a | 439.70 | 414.20 |
| CD elongation, % | n/a | 20.20 | 20.30 |
| Fuzz (baby side), gms | n/a | 0.00 | 0.16 |

TABLE 7

| MATERIAL COMPOSITION AND PROPERTIES | L4 920.2 | L4 920.5 | L4 920.6 |
|---|---|---|---|
| TOP LAYER | 100% Herculon T101 polypropylene 1.8 dpf × 38 mm | 100% Herculon T116 polypropylene 2.2 dpf × 38 mm | 100% Herculon T116 polypropylene 2.2 dpf × 38 mm |
| MIDDLE LAYER | Exxon LLDPE film EMB 610 0.8 mils white | Exxon LLDPE film EMB 610 0.8 mils white | Exxon LLDPE film EMB 610 0.8 mils white |
| BOTTOM LAYER | 100% Herculon T101 polypropylene 6.0 dpf × 38 mm | 85% Herculon T124 polypropylene 2.0 dpf × 38 mm + 15% Courtaulds 5.0 dpf × 40 mm rayon fibers | 85% Herculon T123 polypropylene 2.0 dpf × 38 mm + 15% Courtaulds 5.0 dpf × 40 mm rayon fibers |
| Total weight, gsy | 45.00 | 47.00 | 44.00 |
| Caliper, mils | 20.00 | 26.00 | 24.00 |
| Strikethrough, secs | 2.48 | 1.93 | 1.70 |
| Rewet, gms | 0.06 | 0.08 | 0.09 |
| Strip properties: | | | |
| MD dry tensile, gms/in | 1,474.00 | 992.00 | 802.00 |
| MD dry elongation, % | 11.00 | 21.00 | 17.00 |
| CD dry tensile, gms/in | 530.00 | 339.00 | 318.00 |
| CD dry elongation, % | 21.00 | 30.00 | 32.00 |

TABLE 8

| COMPOSITION AND PROPERTIES | L4 959.2 | L4 959.4 | L4 959.5 | L4 959.5a |
|---|---|---|---|---|
| TOP LAYER | 100% Herculon T142 polypropylene 3.25 dpf × 38 mm | 100% Herculon T116 polypropylene 2.0 dpf × 38 mm | 100% Herculon T116 polypropylene 2.0 dpf × 38 mm | 100% Herculon T116 polypropylene 2.0 dpf × 38 mm |
| MIDDLE LAYER | Exxon LLDPE film EMB 610 0.8 mils white | Exxon LLDPE film EMB 610 0.8 mils white | Exxon LLDPE film EMB 610 0.8 mils white | Exxon LLDPE film 0.5 mils white |
| BOTTOM LAYER | 100% Herculon T117 polypropylene 6.0 dpf × 38 mm | 100% Herculon T117 polypropylene 6.0 dpf × 38 mm | 70% Herculon T117 polypropylene 2.0 dpf × 38 mm 30% Herculon 6.0 dpf × 38 mm | 70% Herculon T117 polypropylene 2.0 dpf × 38 mm 30% Herculon 6.0 dpf × 38 mm |
| Total weight, gsy | 37.57 | 39.45 | 38.28 | 31.41 |
| Caliper, mils | 21.12 | 22.35 | 20.36 | 16.34 |
| Strikethrough, secs | 2.64 | 2.53 | 3.00 | 2.88 |
| Rewet, gms | 0.05 | 0.07 | 0.06 | 0.09 |
| DRY STRIP: | | | | |
| MD tensile, g/in | 727.50 | 856.80 | 941.80 | 953.80 |
| MD elongation, % | 14.09 | 18.36 | 18.83 | 11.70 |
| CD tensile, g/in | 274.20 | 327.70 | 301.90 | 187.30 |
| CD elongation, % | 46.57 | 42.04 | 38.61 | 74.87 |
| WET TENSILES: | | | | |
| MD tensile, g/in | 886.00 | 946.10 | 1,067.00 | 1,114.00 |
| MD elongation, % | 14.72 | 19.37 | 21.55 | 11.87 |
| CD tensile, g/in | 311.40 | 370.60 | 356.40 | 215.20 |
| CD elongation, % | 44.85 | 38.27 | 33.97 | 65.96 |
| Fuzz - baby side, gms | 0.01 | 0.00 | 0.00 | 0.00 |

Multi-functional Diaper Topsheets

A multi-functional diaper topsheet can be defined as a material that performs the function of both the top and secondary layers of a diaper. In commercially available premium or thin sized diapers, the top layer is a composite comprising a nonwoven and tissue glued together, and the secondary layer is a heavy weight lofty through-air bonded structure. There has been a trend in the industry toward the development of diapers having thin absorbent cores. To effectively utilize and supplement these thin cores, both a topsheet and secondary layer have been required to perform as urine acquisition, distribution and storage layers.

The multi-functional topsheet of this invention combines the functions of both the top and secondary layers in one layer, thus realizing a potential cost savings. The top outer carded web is made smooth, soft and apertured and the bottom outer carded web is made lofty, coarse and partially apertured. The top layer comprises hydrophilic fibers or blends of fibers dependent upon the strikethrough and rewet characteristics desired. The bottom layer comprises a blend of polypropylene, polyester, and polyester/polypropylene bicomponent fibers. The polypropylene fibers enable aperturing to take place and provide the required fluid distribution characteristics. The polyester fibers and the polyester portion of the bicomponent fibers provide the resiliency and loft needed in the underlayer for effective core utilization. The polyethylene sheath portion of the PET/PE bicomponent fibers helps in fusing the polyester fiber together in the bottom layer. Multi-functional topsheets in accordance with the invention were manufactured using a medium sized diamond pattern and tested like the uni-functional topsheet described above. Table 9 summarizes the composition and physical properties of four (4) such topsheets.

film as the top layer in contact with the skin. These apertured films while functioning excellently to keep the surface clean and dry, are very uncomfortable for the wearer because of its non-textile like composition resulting in a hot, plasticky feel. While apertured nonwovens made by other processes like spunlacing can potentially be used in lieu of these apertured film based topsheets, they are very expensive and do not keep the surface dry. Further, approximately 40–65% of women using commercial full sized sanitary napkins experience failure during their menstrual cycle.

When the apertured nonwoven of the present invention is used in a full size feminine hygiene sanitary napkin, it serves

TABLE 9

| COMPOSITION | L4 933.1 | L4 933.2 | 959.12 | 959.13 |
|---|---|---|---|---|
| TOP LAYER | 100% Herculon T123 polypropylene 2.0 dpf × 38 mm | 100% Herculon T123 polypropylene 2.0 dpf × 38 mm | 70% Herculon T117 polypropylene 2.0 dpf × 38 mm 30% Herculon T142 polypropylene 3.25 dpf × 38 mm | 70% Herculon T117 polypropylene 2.0 dpf × 38 mm 30% Herculon T142 polypropylene 325 dpf × 38 mm |
| MIDDLE LAYER | Exxon LLDPE film EMB 610 0.8 mils white | Exxon LLDPE film EMB 610 0.8 mils white | Exxon LLDPE film 1.0 mils white | Exxon LLDPE film EMB 610 0.8 mils white |
| BOTTOM LAYER | 50% Herculon T124 polypropylene 2.0 dpf × 38 mm 30% Hoechst T224 polyester 6.0 dpf × 38 mm 20% Hoechst T256 PET/PE bico 3.0 dpf × 38 mm | 50% Herculon T124 polypropylene 2.0 dpf × 38 mm 30% Hoechst T224 polyester 6.0 dpf × 38 mm 20% Hoechst T256 PET/PE bico 3.0 dpf × 38 mm | 50% Herculon T117 polypropylene 6.0 dpf × 38 mm 30% Hoechst T224 polyester 6.0 dpf × 38 mm 20% Hoechst T256 PET/PE bico 3.0 dpf × 38 mm | 50% Herculon T117 polypropylene 6.0 dpf × 38 mm 30% Hoechst T224 polyester 6.0 dpf × 38 mm 20% Hoechst T256 PET/PE bico 3.0 dpf × 38 mm |
| Weight, gsy | 53.00 | 58.00 | 51.31 | 46.78 |
| Caliper, mils | 32.00 | 36.00 | 24.85 | 25.00 |
| Strikethrough, secs | 1.70 | 1.66 | 2.09 | 1.99 |
| Rewet, gms | 0.06 | 0.05 | 0.08 | 0.10 |
| DRY STRIP: | | | | |
| MD tensile, g/in | 1,199.00 | 1,212.00 | 968.70 | 929.10 |
| MD elongation, % | 17.00 | 23.00 | 27.07 | 18.93 |
| CD tensile, g/in | 328.00 | 358.00 | 360.60 | 291.10 |
| CD elongation, % | 34.00 | 31.00 | 60.60 | 40.08 |
| WET STRIP: | | | | |
| MD tensile, g/in | n/a | n/a | 1,047.00 | 1,053.00 |
| MD elongation, % | n/a | n/a | 25.70 | 18.69 |
| CD tensile, g/in | n/a | n/a | 386.00 | 323.30 |
| CD elongation, % | n/a | n/a | 57.72 | 36.88 |
| Fuzz - baby side, gms | n/a | n/a | 0.00 | 0.01 |

Sanitary Napkin Topsheets

Feminine hygiene sanitary napkins fall into two categories, i.e., full size napkins and panty shields. Full sized napkins are used by women during menstruation to absorb menstrual fluid during a three to five day period. The popular full sized napkins commercially available use an apertured the dual purpose of being apertured and possessing the desired comfort because of its textile composition. Table 10 summarizes the fiber composition and properties of three (3) samples of apertured nonwoven topsheets for use in sanitary napkins.

TABLE 10

| MATERIAL COMPOSITION | L4 952.4 | L4 959.6 | L4 959.11 |
|---|---|---|---|
| TOP LAYER | 100% Herculon T118 polypropylene 2.0 dpf × 38 mm | 100% Herculon T118 polypropylene 2.0 dpf × 38 mm | 100% Herculon T118 polypropylene 2.0 dpf × 38 mm |
| MIDDLE LAYER | Exxlon LLDPE film EMB 610 0.8 mils white | Exxlon LLDPE film EMB 610 0.8 mils white | Exxlon LLDPE film 1.0 mils white |

TABLE 10-continued

| MATERIAL COMPOSITION | L4 952.4 | L4 959.6 | L4 959.11 |
|---|---|---|---|
| BOTTOM LAYER | 100% Herculon T117 polypropylene 6.0 dpf × 38 mm | 70% Herculon T117 polypropylene 2.0 dpf × 38 mm 30% Herculon T117 polypropylene 6.0 dpf × 38 mm | 50% Herculon T117 polypropylene 6.0 dpf × 38 mm 30% Hoechst T224 polyester 6.0 dpf × 38 mm 20% Hoechst T256 PET/PE bicomponent 3.0 dpf × 38 mm |
| Weight, gsy | 38.60 | 36.50 | 51.94 |
| Caliper, mils | 22.70 | 19.30 | 25.53 |
| Strikethrough, secs | 10.10 | 3.70 | 3.76 |
| Rewet, gms | 0.04 | 0.04 | 0.05 |
| DRY TENSILES: | | | |
| MD tensile, g/in | 857.40 | 960.80 | 975.60 |
| MD elongation, % | 17.40 | 13.58 | 26.48 |
| CD tensile, g/in | 369.40 | 273.00 | 387.70 |
| CD elongation, % | 26.80 | 38.69 | 61.30 |
| WET TENSILES: | | | |
| MD tensile, g/in | 970.40 | 1,052.00 | 1,060.00 |
| MND elongation, % | 17.90 | 12.48 | 26.87 |
| CD tensile, g/in | 404.70 | 324.30 | 411.50 |
| CD elongation, % | 20.00 | 31.88 | 57.80 |
| Fuzz - baby side, gms | 0.00 | 0.01 | 0.00 |

Sample L4 952.4 has hydrophobic fibers T118 in the top layer and has circular or oval apertures. Sample 959.6 has medium diamond apertures and a larger open area. Sample L4 959.11 is a composite sanitary napkin topsheet designed to replace both the existing apertured film and the accompanying tissue based transfer layer found underneath in some commercially available sanitary napkins. The top layer comprises hydrophobic fibers and the bottom layer comprises a blend of polypropylene, polyester and polyester/polyethylene bicomponent fibers. The polypropylene fibers enable aperturing to take place and provide the required fluid distribution characteristics. The polyester fibers and the polyester portion of the bicomponent fibers provide the resiliency and loft needed in the underlayer for effective core utilization. The polyethylene sheath portion of the PET/PE bicomponent fibers help in fusing the polyester fiber together in the underlayer.

Apertured nonwoven fabrics may also be made using cotton or rayon fibers to provide the best comfort for the wearer. Samples of such apertured materials and their properties are summarized in Table 11. These samples each have large diamond shaped apertures.

TABLE 11

| MATERIAL COMPOSITION | TL10 199.2 | TL10 201.4 |
|---|---|---|
| TOP LAYER | 70% Easy Street Cotton 30% Courtaulds Rayon 1.5 dpf × 40 mm | 100% Courtaulds Rayon #14561 2.0 dpf × 38 mm |
| MIDDLE LAYER | CT Films LLDPE film 0.75 mils white | LLDPE film 1.0 mils pink |
| BOTTOM LAYER | 70% Easy Street Cotton 30% Courtaulds Rayon 1.5 dpf × 40 mm | 100% Courtaulds Rayon #14561 2.0 dpf × 38 mm |
| Weight, gsy | 40.00 | 54.00 |
| Calipers, mils | 21.80 | 23.10 |
| Sinktime, secs | 8.20 | 1.67 |
| Abs. capacity, gm/gm | 14.20 | 13.50 |

TABLE 11-continued

| MATERIAL COMPOSITION | TL10 199.2 | TL10 201.4 |
|---|---|---|
| DRY STRIP TENSILE: | | |
| MD tensile, g/in | 411.60 | 1,039.00 |
| MD elongation, % | 19.40 | 36.30 |
| CD tensile, g/in | 152.80 | 244.30 |
| CD elongation, % | 94.50 | 87.60 |
| WET TENSILES: | | |
| MD tensile, g/in | 364.80 | 1,094.00 |
| MD elongation, % | 30.40 | 45.30 |
| CD tensile, g/in | 167.40 | 242.10 |
| CD elongation, % | 94.30 | 86.40 |

In addition to the strikethrough/rewet test described above, the uni-functional and multi-functional diaper topsheets were evaluated using a Diaper Acquisition Test ("DATE") and a Four Insult Repetitive Strikethrough test ("FIRST"). The full size sanitary napkin topsheets were evaluated by comparing strikethrough and rewet characteristics against a control apertured film using proprietary animal blood which possesses the same characteristics as menstrual fluid.

Diaper Acquisition Test

This test simulates the performance of a topsheet by incorporating it in a commercially available diaper, i.e., replacing the diaper's outer layers with the apertured nonwoven topsheet of the invention. Four insults, each containing 40 ml of 0.09% saline solution (a total of 160 ml), are delivered to the newly formed diaper in one hour to simulate the toughest conditions, namely heavy, overnight use. The acquisition time or strikethrough (seconds) and rewet (grams) are measured. A Quality Index is then calculated based on the fourth acquisition time using the following formula:

$$\text{Quality Index} = 240{,}000/(\text{4th acquisition time}) * (\text{pad weight})^2$$

Higher quality index numbers represent better diaper performance. Lower fourth acquisition times represent better topsheet performance.

First, commercially available diapers were tested using the DATE method. All diapers tested were large size and meant for babies in the 22–35 lbs weight range. Table 12 shows the results for the benchmark tests.

TABLE 12

| DIAPER DESCRIPTION | SIZE (lbs) | ACQUISITION TIME/INSULT (secs) | | | | REWET (gms) | QUALITY INDEX |
| --- | --- | --- | --- | --- | --- | --- | --- |
| | | 1st | 2nd | 3rd | 4th | | |
| Drypers ™ Cozies | 22–35 | 8.60 | 37.76 | 74.00 | 94.50 | 0.09 | 4.69 |
| Huggies ™ Ultra Trim For Him | 22–35 | 9.08 | 32.02 | 36.83 | 38.04 | 0.02 | 15.54 |
| Paragon CVS Ultra for boys | 22–35 | 10.81 | 24.05 | 32.59 | 33.83 | 0.07 | 12.14 |
| P&T Dri Bottoms ™ Ultra Thin | 22–35 | 32.29 | 200.00 | 200.00 | 200.00 | 2.39 | 2.69 |
| Pampers ™ Premium Extra Absorbent | 21–37 | 7.23 | 20.46 | 26.27 | 32.33 | 0.08 | 13.36 |

Of the diapers tested, the Pampers™ Premium Extra Absorbent diaper made by Procter & Gamble Company, Ohio and the CVS Ultra for boys' diapers made by Paragon Trade Brands Inc., Washington, were selected as controls #1 and #2, respectively.

Figure 13:
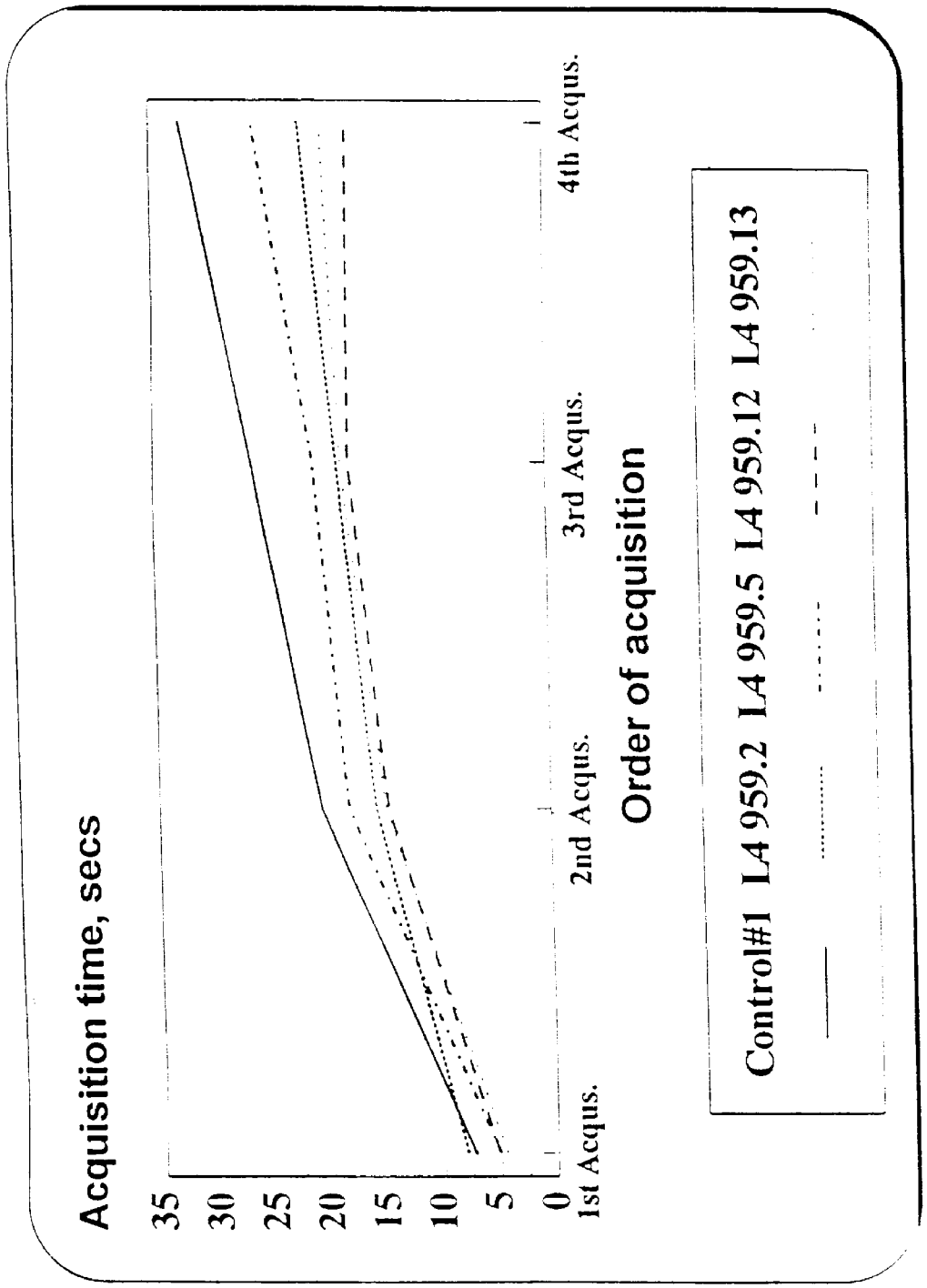
FIG. 13 is a graph showing acquisition or strikethrough times obtained for control #1 and the apertured nonwoven samples in accordance with the invention.

Four apertured topsheets in accordance with the invention (L4 959.2, L4 959.5, L4 959.12 and L4 959.13) were tested against control #1. The control's topsheet was replaced by each of the four apertured topsheets and the DATE test was completed for each. The superior nature of the apertured topsheets is evidenced by a 30–70% reduction of fourth acquisition time and 15–50% increase of the quality index. Table 13 summarizes the results of the tests and FIG. 13 shows that the acquisition times of the apertured topsheets of the invention increases at a much lower rate than the acquisition times for control #1.

TABLE 13

| Test Data | Control #1 | L4 959.2 | L4 959.5 | L4 959.12 | L4 959.13 |
| --- | --- | --- | --- | --- | --- |
| 1st Acquisition (secs) | 7.23 | 7.96 | 5.07 | 5.14 | 4.49 |
| 2nd Acquisition | 20.46 | 15.60 | 18.02 | 14.48 | 14.74 |
| 3rd Acquisition | 26.27 | 18.66 | 20.79 | 17.59 | 18.28 |
| 4th Acquisition | 32.33 | 21.75 | 25.89 | 17.50 | 19.80 |
| Rewet (grams) | 0.08 | 0.02 | 0.06 | 0.03 | 0.04 |
| Quality index | 13.36 | 20.27 | 16.47 | 21.70 | 20.69 |

Figure 14:
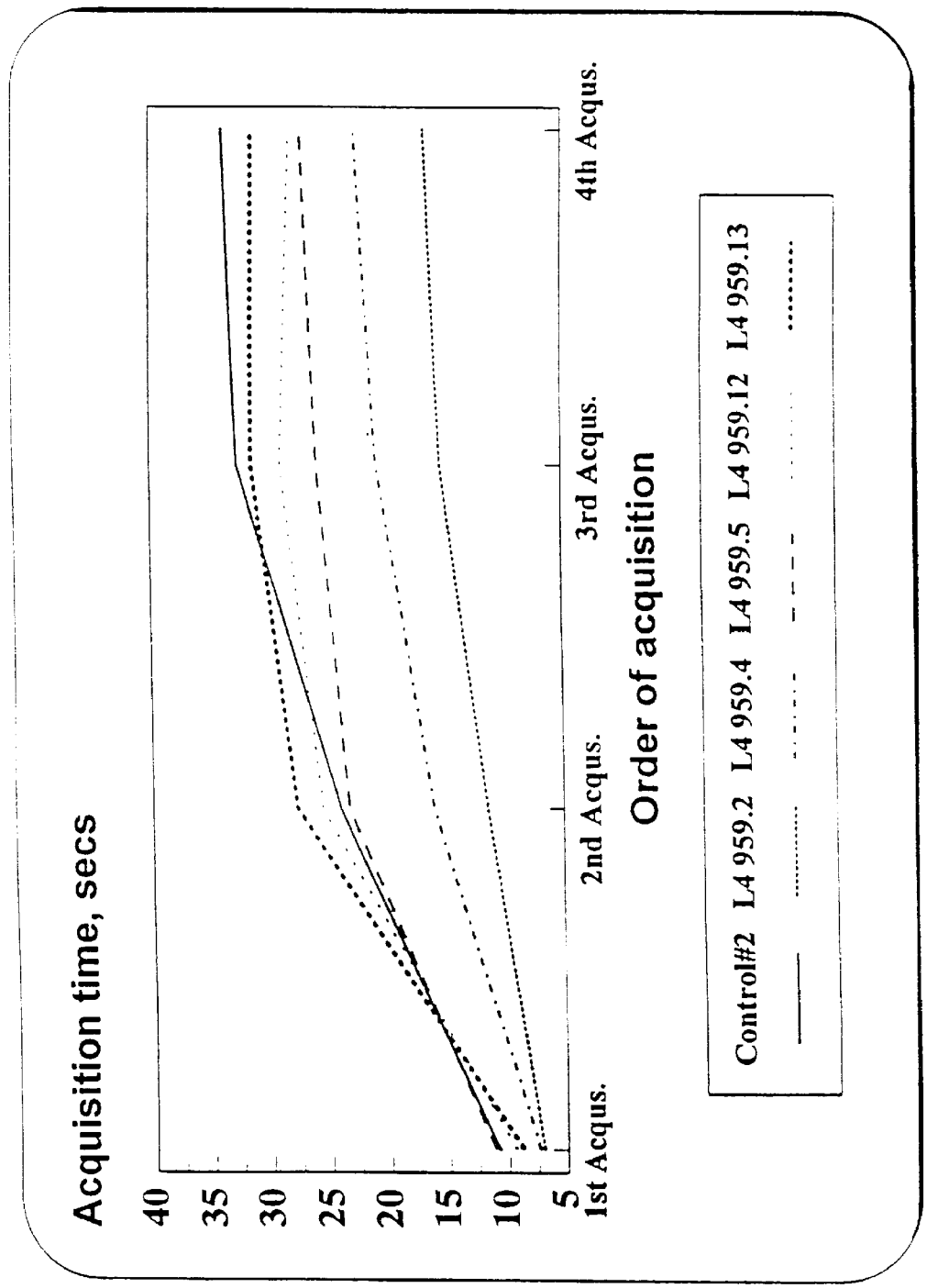
FIG. 14 is a graph showing acquisition or strikethrough times obtained for control #2 and the apertured nonwoven samples in accordance with the invention.

Five apertured topsheets in accordance with the invention (L4 959.2, L4 959.4, L4 959.5, L4 959.12 and L4 959.13) were tested against control #2 using the same method as used for control #1. The superior nature of the apertured topsheets is evidenced by a 7–50% reduction of fourth acquisition time and 9–125% increase of the quality index. Table 14 summarizes the results of the tests and FIG. 14 shows that the acquisition times for the apertured topsheets designated L4 959.2 and L4 959.4 increase at a much lower rate than the acquisition times for control #2.

TABLE 14

| Test Data | Control #1 | L4 959.2 | L4 959.4 | L4 959.5 | L4 959.12 | L4 959.13 |
| --- | --- | --- | --- | --- | --- | --- |
| 1st Acquisition (secs) | 10.81 | 7.02 | 7.36 | 11.14 | 9.36 | 8.75 |
| 2nd Acquisition | 24.05 | 11.49 | 16.05 | 23.30 | 25.57 | 27.74 |
| 3rd Acquisition | 32.59 | 15.30 | 20.75 | 25.84 | 28.88 | 31.35 |
| 4th Acquisition | 33.83 | 16.68 | 22.63 | 27.22 | 28.11 | 31.34 |
| Rewet (grams) | 0.07 | 0.20 | 0.09 | 0.05 | 0.04 | 0.04 |
| Quality Index | 12.14 | 27.61 | 19.69 | 15.32 | 17.01 | 13.24 |

Four Insult Repetitive Strikethrough Test

This test is used to evaluate repetitive fluid handling properties of a topsheet. In this test method, the strikethrough time and rewet are measured four consecutive times using filter paper (5 inches×5 inches) as the core material. The less time it takes for the test liquid to pass through the topsheet, the better the strikethrough value. Topsheet materials function better when there is a small rate of increase in strikethrough with every insult.

Two types of commercially available nonwoven topsheets were used as controls. The first was a hydrophilic thermal bond nonwoven (TB#1) and the other was a hydrophilic spunbond nonwoven (SB#1). Both controls have a basis weight in the range of 16 to 20 gsy. Three apertured topsheets in accordance with the invention (L4 959.4, L4 959.5 and L4 959.6) were compared to the control materials. Table 15 summarizes the results of the FIRST tests.

TABLE 15

| Insult # | STRIKETHROUGH (seconds) | | | | REWET (grams) | | | |
| --- | --- | --- | --- | --- | --- | --- | --- | --- |
| | 1st | 2nd | 3rd | 4th | 1st | 2nd | 3rd | 4th |
| TB #1 | 1.90 | 23.50 | 23.10 | 18.50 | 0.16 | 0.14 | 0.15 | 0.17 |
| SB #1 | 1.97 | 13.65 | 22.53 | 12.38 | 0.13 | 0.12 | 0.13 | 0.12 |
| L4 959.4 | 2.40 | 2.40 | 4.50 | 4.20 | 0.07 | 0.08 | 0.08 | 0.10 |
| L4 959.5 | 3.60 | 2.00 | 2.50 | 3.00 | 0.07 | 0.06 | 0.08 | 0.07 |
| L4 959.6 | 2.10 | 6.30 | 7.80 | 7.10 | 0.04 | 0.04 | 0.04 | 0.04 |

Table 15 shows that control samples TB#1 and SB#1 fall within the accepted industry norms of a first strikethrough time of less than 3.0 seconds and a rewet around 0.1 grams. However, after the first insult, the control samples have erratic results. For example, the second insults to the control samples provide a 590 to 1140% increase in strikethrough time. This indicates that the hydrophilic finish on the fibers in the control samples is quickly washed off. Although the topsheets of this invention have marginally higher first strikethrough times when compared to the control samples, they continue to exhibit extremely good strikethrough values during the second, third and fourth insults. This indicates that the apertures are responsible for fluid handling rather than the hydrophilicity of the fibers, and the problem of finish wash-off is offset by the presence of apertures. Further, the first strikethrough times of the apertured topsheets can be reduced below 2.0 seconds by using hydrophilic finishes similar to the finishes used on the commercial control samples. The rewet numbers for the apertured nonwovens are also below the 0.1 industry norm after four insults, which indicates that the apertured topsheets have the potential of reducing baby skin rashes because the surface is very dry.

Animal Blood Rewet Studies

Apertured topsheets for use on sanitary napkins were tested using the FIRST test and a proprietary animal blood fluid which simulates menstrual fluid. In this test, the topsheets were subjected to repetitive insults of the fluid. The control material for this test was a special apertured film obtained from a commercially available Always™ brand medium maxi pad. The apertured topsheet designated L4 959.5 was tested and compared to the control material. The apertured topsheet exhibited an average rewet after four insults of 0.59 grams, while the control exhibited an average rewet of 0.74 grams. This indicates that the apertured topsheet of this invention satisfies the two most important requisites for a sanitary napkin, namely, keeping the surface dry and providing a comfortable textile feel. Table 16 summarizes the test results for sanitary napkin topsheets.

TABLE 16

| REWET (grams) | CONTROL | L4 959.4 |
|---|---|---|
| 1st Insult | 0.86 | 0.63 |
| 2nd Insult | 0.60 | 0.87 |
| 3rd Insult | 0.65 | 0.48 |
| 4th Insult | 0.85 | 0.37 |
| Average | 0.74 | 0.59 |

Although the invention has been described with reference to certain preferred processes and examples, it will be appreciated that many other variations and modifications thereof may be devised in accordance with the principles disclosed herein. For example, different variations utilizing other types of films and polymeric materials can produce apertured products using the same basic concept of the invention. Fibers other than olefinic fibers, for example polyesters, polyamides, etc., may be used for the carded web(s). The invention and all such variations and modifications thereof within the scope and spirit of the invention are defined in the following claims.

We claim:

1. A topsheet for use in hygenic products comprising a carded web of fibers having a first melting temperature and a polymeric sheet having a second melting temperature and a property of shrinking under application of heat, wherein the topsheet is calendared by heated calendaring points of a calendar roll, said polymeric sheet being made of a selected material having said second melting temperature at least about 35° C. lower than said first melting temperature of said fibers and the property of shrinking under the heat of the calendaring points such that said polymeric sheet quickly melts and becomes fused to said fibers and pulls said fibers away from said calendaring points, whereby said topsheet is formed with apertures generated at said calendaring points completely through the topsheet.

2. A topsheet according to claim 1 wherein said fibers are polypropylene fibers having high tenacity and low elongation.

3. A topsheet according to claim 1, wherein said polymeric sheet is selected from the group consisting of an olefinic material with ethylvinyl acetate copolymer, olefinic material with polystyrenic blends, an elastomeric material, and a heat-shrink material.

4. A topsheet according to claim 3, wherein said polymeric sheet is a linear low density polyethylene film.

5. A topsheet according to claim 4, wherein said film has a caliper of 0.5 to 1.0 mils and a weight of 11 to 21 gsy.

6. A topsheet according to claim 1, wherein the topsheet has a weight in the range of 25–65 gsy.

7. A topsheet according to claim 1, wherein the topsheet comprises two outer carded webs and an intermediate polymeric sheet sandwiched therebetween.

8. A topsheet according to claim 7, wherein said outer carded webs comprise polypropylene fibers having high tenacity and low elongation, and said polymeric sheet comprises a linear low density polyethylene film.

9. A topsheet according to claim 8, wherein one of said outer carded webs further comprises rayon fibers.

10. A topsheet according to claim 8, wherein the topsheet has a weight in the range of 34–47 gsy and a caliper of approximately 16–26 mils.

11. A topsheet according to claim 8, wherein the tophseet exhibits a strikethrough time of less than 3.80 seconds and rewet of less than 0.09 grams.

12. A topsheet according to claim 8, wherein one of said outer carded webs further comprises a blend of polyester fibers and polyester/polyethylene bicomponent fibers.

13. A topsheet according to claim 12, wherein the topsheet has a weight in the range of about 46–58 gsy and a caliper of approximately 24–36 mils.

14. A topsheet according to claim 12, wherein the tophseet exhibits a strikethrough time of less than 3.00 seconds and rewet of less than 0.10 grams.

15. A topsheet according to claim 7, wherein said outer carded webs comprise non-thermoplastic fibers, and said polymeric material layer comprises a linear low density polyethylene film.

16. A topsheet according to claim 15, wherein said non-thermoplastic fibers comprise rayon fibers, cotton fibers or blends thereof.

17. A topsheet according to claim 1, wherein said apertures have a length dimension of 0.5–5.0 mm and a width dimesnion of 0.25–5.0 mm.

* * * * *